(12) United States Patent
Kubo et al.

(10) Patent No.: US 10,830,585 B2
(45) Date of Patent: Nov. 10, 2020

(54) NON-CONTACT TYPE DISPLACEMENT SENSOR

(71) Applicant: MITUTOYO CORPORATION, Kanagawa (JP)

(72) Inventors: Koji Kubo, Tokyo (JP); Yuko Shishido, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/519,117

(22) Filed: Jul. 23, 2019

(65) Prior Publication Data
US 2020/0041267 A1    Feb. 6, 2020

(30) Foreign Application Priority Data

Aug. 1, 2018    (JP) ................. 2018-144933

(51) Int. Cl.
*G01C 3/32*    (2006.01)
*G01C 3/02*    (2006.01)
(Continued)

(52) U.S. Cl.
CPC .............. *G01C 3/02* (2013.01); *G01S 17/08* (2013.01); *G02B 3/14* (2013.01); *G02B 26/004* (2013.01);
(Continued)

(58) Field of Classification Search
CPC .. G01C 3/02; G01C 3/32; G01S 17/08; G02B 3/14; G02B 26/004; H04N 5/2256; H04N 5/23229
See application file for complete search history.

(56) References Cited

U.S. PATENT DOCUMENTS 4,830,498 A * 5/1989 Nishimoto ............... G01C 3/32
356/400
2010/0177376 A1    7/2010 Arnold et al.
(Continued)

FOREIGN PATENT DOCUMENTS

| JP | H11-23219 A | 1/1999 |
| JP | 2009-122105 A | 6/2009 |
| JP | 2018-189700 A | 11/2018 |

OTHER PUBLICATIONS

U.S. Appl. No. 16/527,486 to Koji Kubo, filed Jul. 31, 2019.
(Continued)

*Primary Examiner* — John R Schnurr
(74) *Attorney, Agent, or Firm* — Greenblum & Bernstein, P.L.C.

(57) ABSTRACT

A non-contact type displacement sensor includes a light source that emits measurement light; a liquid lens apparatus in which a refractive index periodically changes in response to an input drive signal; an objective lens emitting, at a measurable object, the measurement light that is emitted from the light source and has passed through the liquid lens apparatus; a photodetector receiving the measurement light that is reflected by the measurable object and outputs a photodetection signal; and a signal processor (controller) that calculates focus timing with which the measurement light is in focus on a surface of the measurable object based on the photodetection signal output from the photodetector, and that obtains a position of the measurable object based on a phase of the focus timing with respect to a cycle of the drive signal.

15 Claims, 10 Drawing Sheets

(51) Int. Cl.
 *G02B 3/14* (2006.01)
 *H04N 5/232* (2006.01)
 *G01S 17/08* (2006.01)
 *H04N 5/225* (2006.01)
 *G02B 26/00* (2006.01)

(52) U.S. Cl.
 CPC ....... *H04N 5/2256* (2013.01); *H04N 5/23229* (2013.01)

(56) References Cited

U.S. PATENT DOCUMENTS

2015/0145980 A1* 5/2015 Bryll .................... G02B 21/241
 348/79
2018/0314041 A1 11/2018 Igasaki et al.

OTHER PUBLICATIONS

U.S. Appl. No. 16/549,323 to Shiro Igasaki et al., filed Aug. 23, 2019.
U.S. Appl. No. 16/414,148 to Hiroshi Sakai et al., filed May 16, 2019.
U.S. Appl. No. 16/556,546 to Shiro Igasaki et al., filed Aug. 30, 2019.
U.S. Appl. No. 16/519,359 to Koji Kubo, filed Jul. 23, 2019.

* cited by examiner

NON-CONTACT TYPE DISPLACEMENT SENSOR

CROSS-REFERENCE TO RELATED APPLICATIONS

The present application claims priority under 35 U.S.C. § 119 of Japanese Application No. 2018-1449.33, filed on Aug. 1, 2018, the disclosure of which is expressly incorporated by reference herein in its entirety.

BACKGROUND OF THE INVENTION

1. Field of the Invention

The present invention relates to a non-contact type displacement sensor.

2. Description of Related Art

Conventionally, as a non-contact type displacement sensor that measures displacement on a surface of a measured object (measurable object), a laser displacement sensor, a chromatic point sensor, and the like are available. In such a non-contact type displacement sensor, a distance to the surface of the measured object is obtained by detecting reflected light from the measured object while changing a focus position of measurement light.

For example, a laser displacement sensor uses a confocal point method and the like, and changes a focus position of measurement light by driving an objective lens on an optical axis. Based on position information of the objective lens on the optical axis when detecting the measurement light reflected on the surface of the measured object, a distance to the surface of the measured object is obtained (see Japanese Patent Laid-open Publication No. H11-23219, for example). On the other hand, a chromatic point sensor uses a white confocal point method, and changes a focus position of the measurement light for every wavelength by dispersing white light source by an axial chromatic aberration. By analyzing a strength profile for every wavelength, wavelength light that is focused on the surface of the measured object is detected and a distance to the surface of the measured object is obtained based on the wavelength light (see Japanese Patent Laid-open Publication No. 2009-122105, for example).

A variable focal length lens using a liquid lens system (hereafter also referred to simply as "lens system"), in which a refractive index periodically changes, has been developed recently (US Published Patent Application No. 2010-0177376). The lens system is formed by immersing a cylindrical vibrating member formed by a piezoelectric material in a transparent liquid. In the lens system, when an AC voltage is applied to an inner circumferential surface and outer circumferential surface of the vibrating member, the vibrating member expands and contracts in a thickness direction and vibrates the liquid inside the vibrating member. By adjusting a frequency of the applied voltage according to a natural frequency of the liquid, a concentric standing wave is formed in the liquid and a concentric region having a different refractive index centered on a center axis line of the vibrating member is formed. Therefore, in the lens system, when light passes along the center axis line of the vibrating member, the light follows a path that diffuses or converges in accordance with the refractive index for each concentric region.

The lens system described above and an objective lens for bringing the light into focus (for example, an ordinary convex lens or a group of lenses) are arranged on the same optical axis to configure a variable focal length lens. When parallel light strikes the ordinary objective lens, light transiting the lens comes into focus at a focus position that lies at a predetermined focal length. In contrast, when parallel light strikes the lens system arranged coaxially with the objective lens, the light is either dispersed or converged by the lens system and the light transiting the objective lens comes into focus at a position offset either farther away or closer than the original (state with no lens system) focus position. Accordingly, in the variable focal length lens, a drive signal (AC voltage of a frequency that generates a standing wave in the interior liquid) that is input to the lens system is applied, and by increasing or decreasing the amplitude of the drive signal, the focus position of the variable focal length lens can be controlled as desired within a set range (a predetermined variable range by which the lens system can increase or decrease the focus position, with the focal length of the objective lens as a reference).

There are following circumstances in the conventional non-contact type displacement sensor noted above. The laser displacement sensor requires a lens driving mechanism that drives the objective lens and a scale for measuring a drive amount of the lens driving mechanism, and the configuration of the laser displacement sensor may become complicated. On the other hand, while a chromatic point sensor does not require a lens driving mechanism and a scale, an amount of data processing is increased to analyze an intensity profile for every wavelength.

SUMMARY OF THE INVENTION

The present invention provides a non-contact type displacement sensor that can simplify a configuration and a process.

The non-contact type displacement sensor according to the present invention includes a light source that emits measurement light, a liquid lens apparatus in which a refractive index periodically changes in response to an input drive signal, an objective lens that emits at a measured object (measurable object) the measurement light that is emitted from the light source and has passed through the liquid lens apparatus, a photodetector receiving the measurement light that is reflected by the measured object and outputs a photodetection signal, and a signal processor that calculates focus timing with which the measurement light is in focus on a surface of the measured object based on the photodetection signal output from the photodetector, and that obtains a position of the measured object based on a phase of the focus timing with respect to a cycle of the drive signal.

In such a configuration, the liquid lens apparatus includes the lens system noted above and the refractive index periodically changes in response to the input drive signal. A variable focal length lens is configured by the liquid lens apparatus together with an objective lens. The focus position of the measurement light by the variable focal length lens changes periodically in response to the drive signal input to the liquid lens apparatus. In other words, the measurement light, that is emitted from a measurement light source and has passed through the variable focal length lens, is emitted at the measured object while changing the focus position in an optical axis direction. The photodetector receives the measurement light that is reflected by the measured object and outputs a photodetection signal. The signal processor calculates focus timing with which the measurement light is in focus on the surface of the measured object based on the photoreceiption signal output from the photodetector. As a method for obtaining the focus timing based on the photodetection signal, various focus detection methods such as a confocal point method, a double pinhole method, an astigmatic method, and a knife edge method can be used. For example, when the confocal point method is used, the variable focal length lens configures an optical system such that the photodetection signal output from the photodetector reaches a peak when the focus position of the measurement light aligns with the surface of the measured object. In this case, the photodetection signal can be calculated using a peak time of the photodetection signal as the focus timing.

In this example, the phase of the focus timing with respect to the cycle of the drive signal corresponds to a position on the surface of the measured object on the optical axis where the objective lens transits. Accordingly, the signal processor, based on the phase of the focus timing with respect to the cycle of the drive signal, can obtain the position on the surface of the measured object on the optical axis by using a function, table, and the like.

As noted above, the present invention does not require a lens drive mechanism and a scale that are conventionally required in the configuration of a laser displacement sensor, by using the variable focal length lens. In addition, the position on the surface of the measured object on the optical axis is found based on the drive signal and photodetection signal, and therefore, processing a large amount of data is not necessary which is performed in the conventional chromatic point sensor. Accordingly, the present invention provides a non-contact type displacement sensor that can simplify the configuration and process.

In the non-contact type displacement sensor according to the present invention, a reference signal outputter that outputs a reference signal synchronized with the cycle of the drive signal is further provided, and preferably, the signal processor calculates the phase of the focus timing with respect to the cycle of the drive signal based on a delay time of the focus timing with respect to the reference signal. In the present invention, the signal processor can calculate the phase of the focus timing by a simple calculation.

In the non-contact type displacement sensor according to the present invention, preferably, the signal processor calculates the phase of the focus timing with respect to the cycle of the drive signal based on a time difference between two of the focus timing that appear in one cycle of the drive signal. In the present invention, the phase of the focus timing can be calculated by a simpler calculation without requiring the reference signal.

The non-contact type displacement sensor of the present invention preferably further includes an illuminator that emits observation light at the measured object via the objective lens, an imaging lens that forms the observation light transiting the objective lens and the liquid lens apparatus after being reflected by the measured object, and an image capturer that captures an image formed by the imaging lens.

In the present invention, the position on the surface of the measured object can be measured and the image of the surface of the measured object can be captured while measuring. Accordingly, a state of the measured object can be confirmed by the image while performing the measurement. When the measurement light enters the imaging lens, a position of the measuring portion in the measured object can also be confirmed by the image.

The non-contact type displacement sensor of the present invention preferably further includes an image processor that performs a deconvolution processing on the image captured by the image capturer. In the present invention, blur can be removed from the captured image by performing the deconvolution processing by the image processor. Accordingly, an observation can be performed with a high degree of accuracy over an entire variable range of the focus position of the variable focal length lens.

The non-contact type displacement sensor of the present invention preferably further includes a plurality of relay lenses that are arranged so as to conjugate an exit pupil of the objective lens and a position of a principal point of the liquid lens apparatus. In the present invention, even when the focus position due to the variable focal length lens is changed, a magnification power of the image entering the image capturer stays constant, and therefore, it is possible to have a good observation without fluctuations in a field of view.

According to the present invention, a non-contact type displacement sensor is provided that can simplify the configuration and process.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings.

First Embodiment

Non-Contact Type Displacement Sensor

Figure 1:
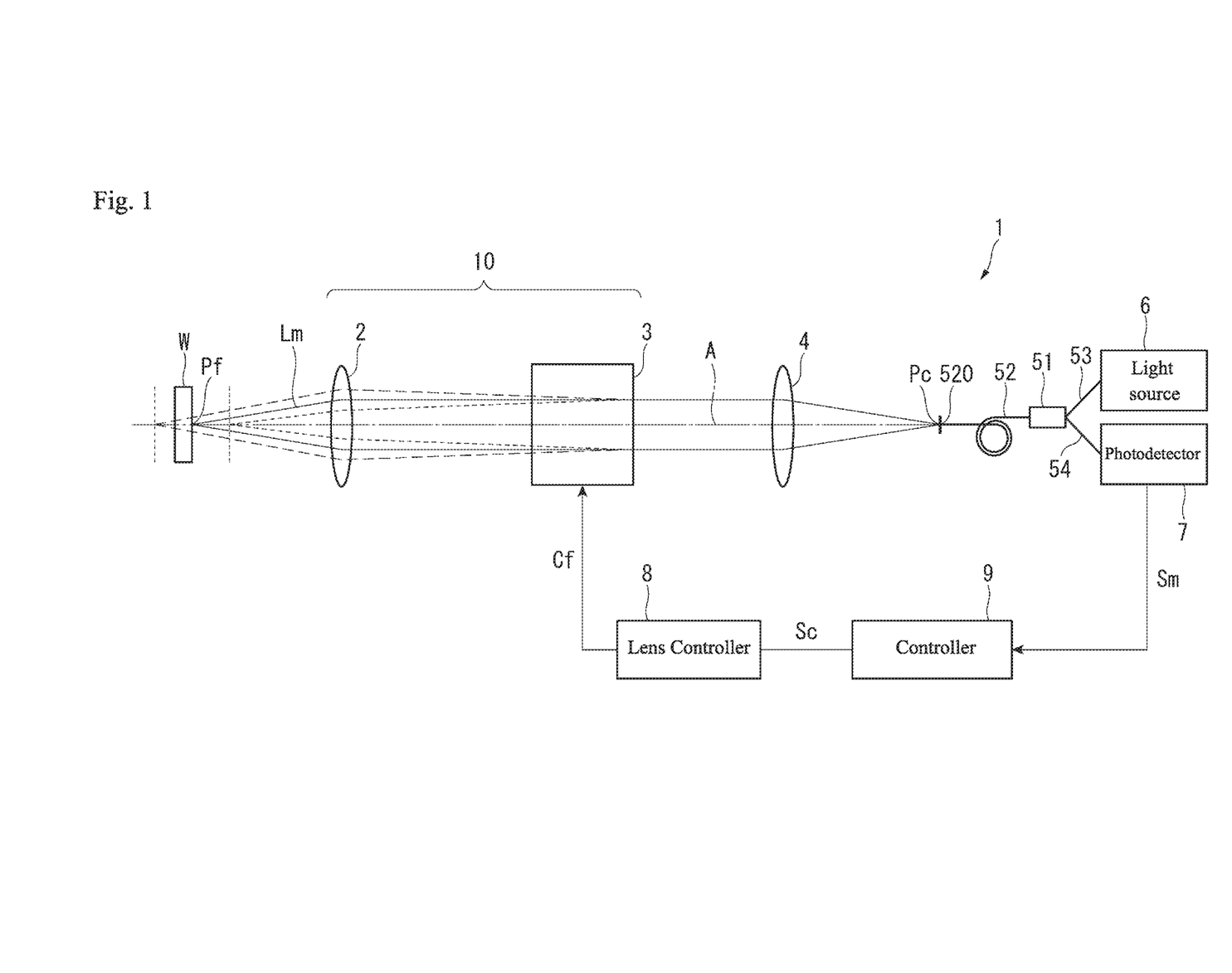
FIG. 1 is a schematic view illustrating a non-contact type displacement sensor according to a first embodiment of the present invention.

As shown in FIG. 1, a non-contact type displacement sensor 1 is configured to include a liquid lens apparatus (liquid lens) 3 in which a refractive index periodically changes, and measures a positional change on a surface of a measured object (measurable object) W that is arranged intersecting with an optical axis A that transits the liquid lens apparatus 3. Specifically, the non-contact type displacement sensor 1 includes a light source 6 that emits measurement light Lm, an optical system (a collimating lens 4 and a light guiding portion 5) that forms an optical path for the measurement light Lm, the liquid lens apparatus 3, an objective lens 2 configuring a variable focal length lens 10 together with the liquid lens apparatus 3, a photodetector 7 receiving the measurement light that is reflected by the measured object W.

Moreover, the non-contact type displacement sensor 1 is provided with a lens controller 8 for controlling operation of the liquid lens apparatus 3 and a controller 9 for operating the lens controller 8. The controller 9 imports and processes a photodetection signal Sm and also calculates the position on the surface of the measured object W on the optical axis A.

Variable Focal Length Lens

The variable focal length lens 10 is configured with the objective lens 2 and the liquid lens apparatus 3. The objective lens 2 is configured by a known convex lens or a group of lenses. The objective lens 2 is arranged coaxially on the optical axis A as the liquid lens apparatus 3. The liquid lens apparatus 3 is configured with a liquid lens system on an interior thereof, and a refractive index changes in response to a drive signal Cf entered from the lens controller 8. The drive signal Cf is a sinusoidal AC signal of a frequency that generates a standing wave in the liquid lens apparatus 3. A focus position Pf of light transiting the variable focal length lens 10 can be changed as desired by changing the refractive index of the liquid lens apparatus 3 with a focal position of the objective lens 2 as a reference.

Figure 2:
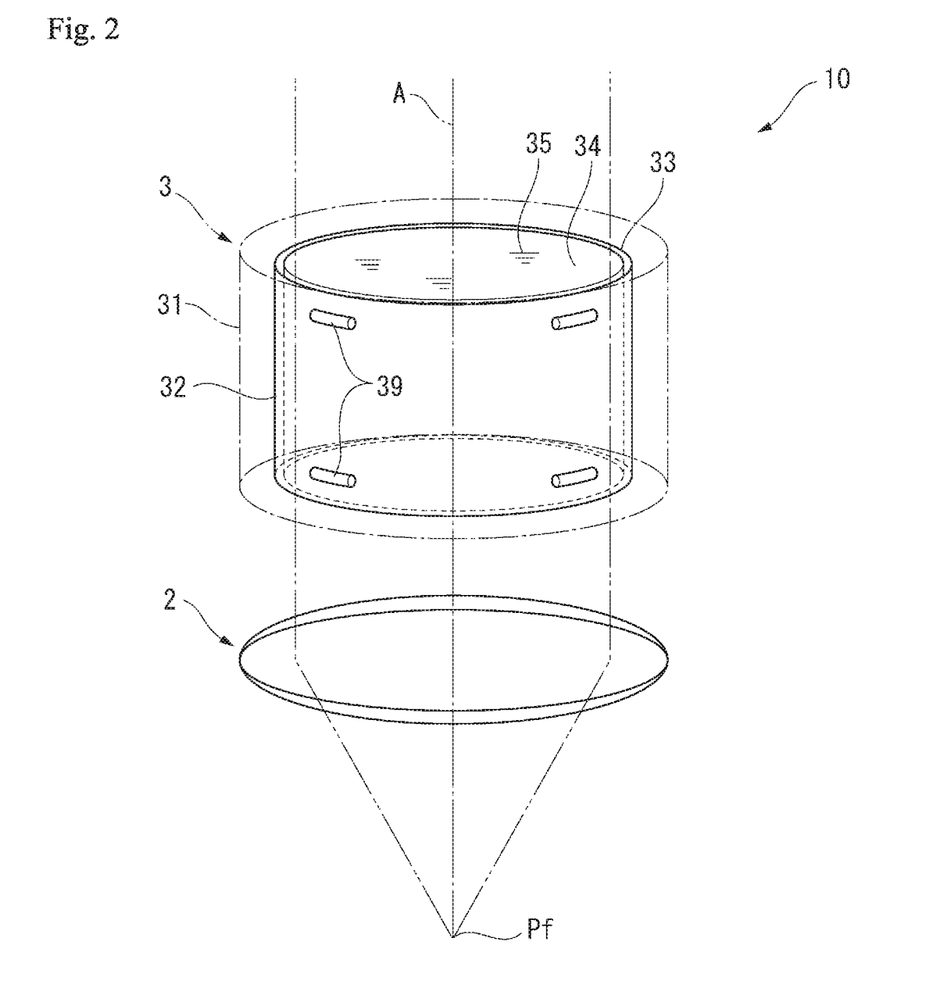
FIG. 2 is a schematic view illustrating a configuration of a liquid lens apparatus according to the first embodiment.

In FIG. 2, the liquid lens apparatus 3 includes a hollow cylindrical case 31, and a hollow cylindrical oscillating member 32 is installed inside the case 31. The oscillating member 32 is supported by spacers 39 made of an elastomer that are disposed between an outer circumferential surface 33 of the oscillating member 32 and an inner circumferential surface of the case 31. The oscillating member 32 is a member where a piezoelectric material is formed in a hollow cylindrical shape. The oscillating member 32 oscillates in a thickness direction due to an AC voltage of the drive signal Cf being applied between the outer circumferential surface 33 and the inner circumferential surface 34. The interior of the case 31 is filled with a highly transparent liquid 35, the entire oscillating member 32 is immersed in the liquid 35, and an inner side of the hollow cylindrical oscillating member 32 is filled with the liquid 35. The AC voltage of the drive signal Cf is adjusted to a frequency that generates a standing wave in the liquid 35 on the inner side of the oscillating member 32.

Figure 3A:
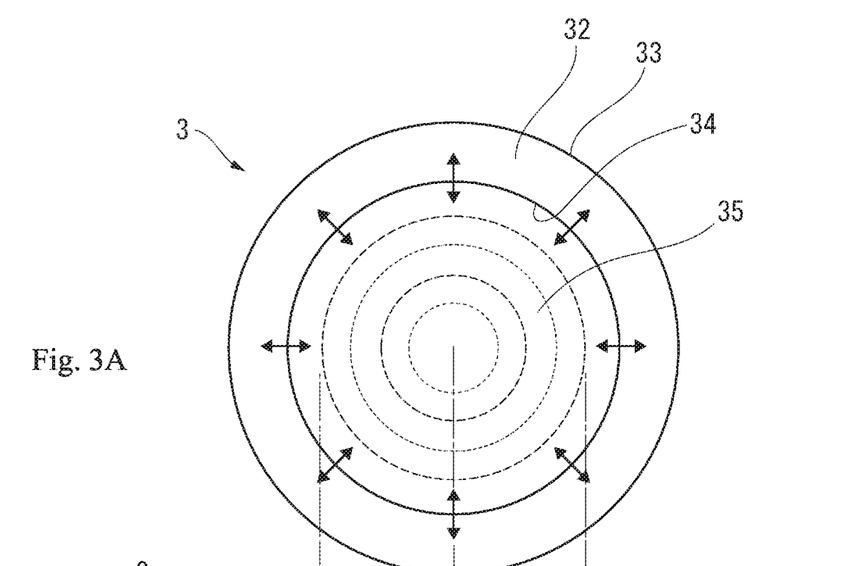
FIGS. 3A to 3C are schematic views illustrating oscillation states of the liquid lens apparatus according to the first embodiment.
Figure 3B:
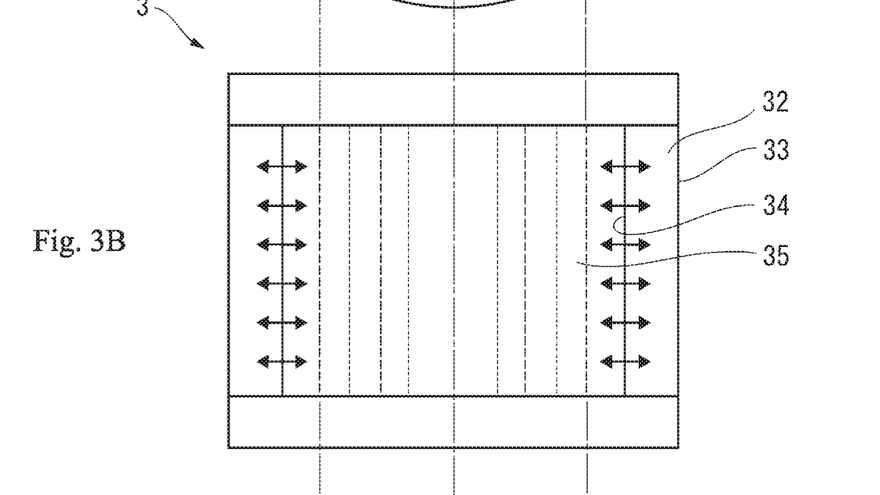
Figure 3C:
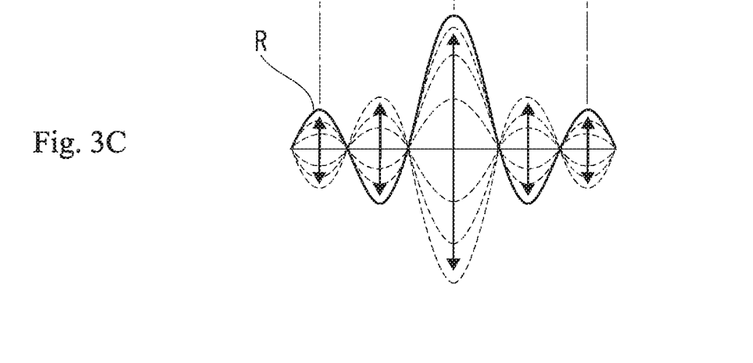
Figure 4A:
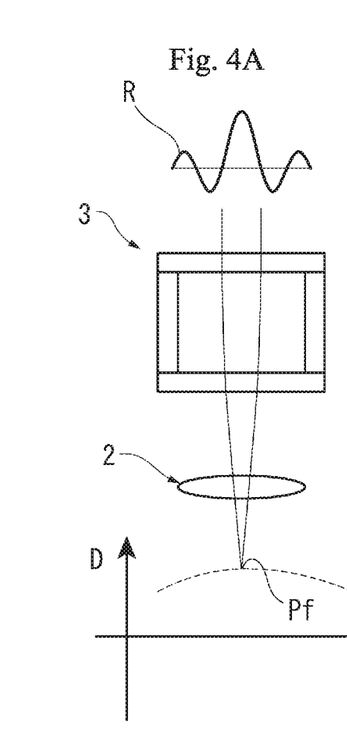
FIGS. 4A to 4E are schematic views illustrating focus positions of the liquid lens apparatus according to the first embodiment.
Figure 4B:
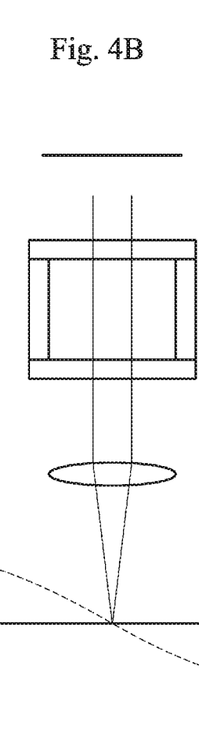
Figure 4C:
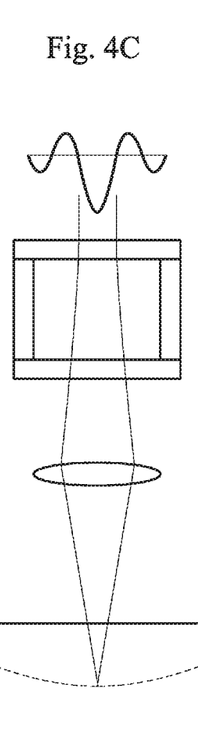
Figure 4D:
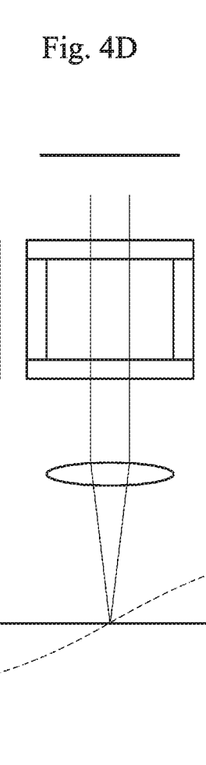
Figure 4E:
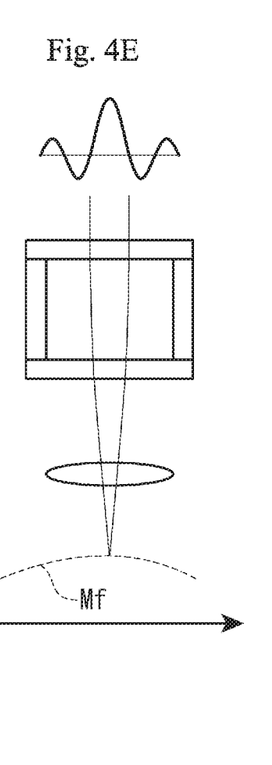

As shown in FIGS. 3A to 3C, in the liquid lens apparatus 3, when the oscillating member 32 is oscillated, a standing wave arises in the interior liquid 35 and concentric circular regions arise where the refractive index alternates (see FIGS. 3A and 3B). At this point, a relationship between a distance from a center axis line of the liquid lens apparatus 3 (radius) and the refractive index of the liquid 35 is as shown by a refractive index distribution R illustrated in FIG. 3C.

In FIGS. 4A to 4E, because the drive signal Cf is a sinusoidal AC signal, bands in the refractive index distribution R of the liquid 35 in the liquid lens apparatus 3 also change in accordance with the drive signal Cf. Also, the refractive index of the concentric circular regions that arise in the liquid 35 changes sinusoidally, and accordingly the focus position Pf changes sinusoidally. In FIGS. 4A to 4E, a distance l1) from the focal position of the objective lens 2 to the focus position Pf is shown. In the state depicted in FIG. 4A, an amplitude of the refractive index distribution R is at its largest, the liquid lens apparatus 3 causes transiting light to converge, and the focus position Pf is the closest to the objective lens 2. In the state depicted in FIG. 4B, the refractive index distribution R is flat, the liquid lens apparatus 3 allows transiting light to transit unaffected, and the focus position Pf is at a standard value. In the state depicted in FIG. 4C, the amplitude of the refractive index distribution R is at its largest at the opposite pole from that of FIG. 4A, the liquid lens apparatus 3 causes transiting light to diffuse, and the focus position Pf is the farthest from the objective lens 2. In the state depicted in FIG. 4D, once again the refractive index distribution R is flat, the liquid lens apparatus 3 allows transiting light to transit unaffected, and the focus position Pf is at the standard value. The state depicted in FIG. 4E, returns once again to the state depicted in FIG. 4A and similar fluctuations are repeated thereafter. In this way, in the variable focal length lens 10, the drive signal Cf is a sinusoidal AC signal, and the focus position Pf also fluctuates sinusoidally, as in a fluctuation waveform Mt in FIGS. 4A to 4E.

In the variable focal length lens 10, by fluctuating the main point of the variable focal length lens 10, a case where the focus position Pf can fluctuate while constantly maintaining the focal length (distance from a main point of the variable focal length lens 10 to the focus position Pf) is also included.

Other Optical System

Referring to FIG. 1 again, an optical system other than the variable focal length lens 10 in the non-contact type displacement sensor 1 is described. The light source 6 is a laser light source, for example, and emits measurement light. The light guiding portion 5 includes a fiber splitter 51 and optical fibers 52 to 54. The fiber splitter 51 includes an optical path where a first end of each optical fiber 52 to 54 is connected and is configured such that the light incident from the optical fiber 53 is guided to the optical fiber 52 and the light incident from the optical fiber 52 is guided to the optical fiber 54.

A second end of the optical fiber 53 is connected to the light source 6. Therefore, the measurement light Lm emitted from the light source 6 transits the optical fiber 53, fiber splitter 51, and the optical fiber 52, and is emitted from an end surface 520 of the optical fiber 52. In this example, the end surface 520 of the optical fiber 52 serves as a point light source. In addition, a second end of the optical fiber 54 is connected to the photodetector 7. Therefore, the measurement light incident on the end surface 520 of the optical fiber 52 transits the optical fiber 52, fiber splitter 51, and the optical fiber 54, and is incident on the photodetector 7. In this example, the end surface 520 of the optical fiber 52 is positioned at a focal point Pc on a rear side of the collimating lens 4. In other words, the end surface 520 of the optical fiber 52 is positioned at a location that forms a conjugate relation with respect to the focus position Pf by the variable focal length lens 10.

The collimating lens 4 is positioned between the end surface 520 of the optical fiber 52 and the liquid lens apparatus 3 on the optical axis A. The collimating lens 4 converts the measurement light Lm emitted from the end surface 520 of the optical fiber 52 into parallel light and enters to the variable focal length lens 10. Also, the collimating lens 4 collects the measurement light Lm that is reflected by the measured object W and transits again the variable focal length lens 10.

The photodetector 7 is a photomultiplier tube, a photo diode, and the like, for example, and is connected to a second end of the optical fiber 54, The photodetector 7 receives the measurement light Lm entered via the optical fiber 54 and outputs a photodetection signal Sm in accordance with the intensity of the received light.

In the configuration noted above, the measurement light Lm emitted from the light source 6, after emitted from the end surface 520 of the optical fiber 52 via the light guiding portion 5, is collimated along the optical axis A by the collimating lens 4 and is emitted at the measured object W via the variable focal length lens 10. The measurement light Lm reflected by a surface of the measured object W is collected by the collimating lens 4 after transiting the variable focal length lens 10. In this example, the focus position Pf by the variable focal length lens 10 changes periodically in a direction of the optical axis A. Therefore, only when the focus position Pf aligns with the surface of the measured object W, the measurement light Lm reflected on the surface forms a spot at the focal point Pc on the rear side of the collimating lens 4 and enters the end surface 520 of the optical fiber 52. Accordingly, the measurement light Lm incident on the photodetector 7 is maximized when the focus position Pf aligns with the surface of the measured object W. In other words, the photodetection signal Sm output from the photodetector 7 reaches a peak when the focus position Pf aligns with the surface of the measured object W.

Lens Controller

Figure 5:
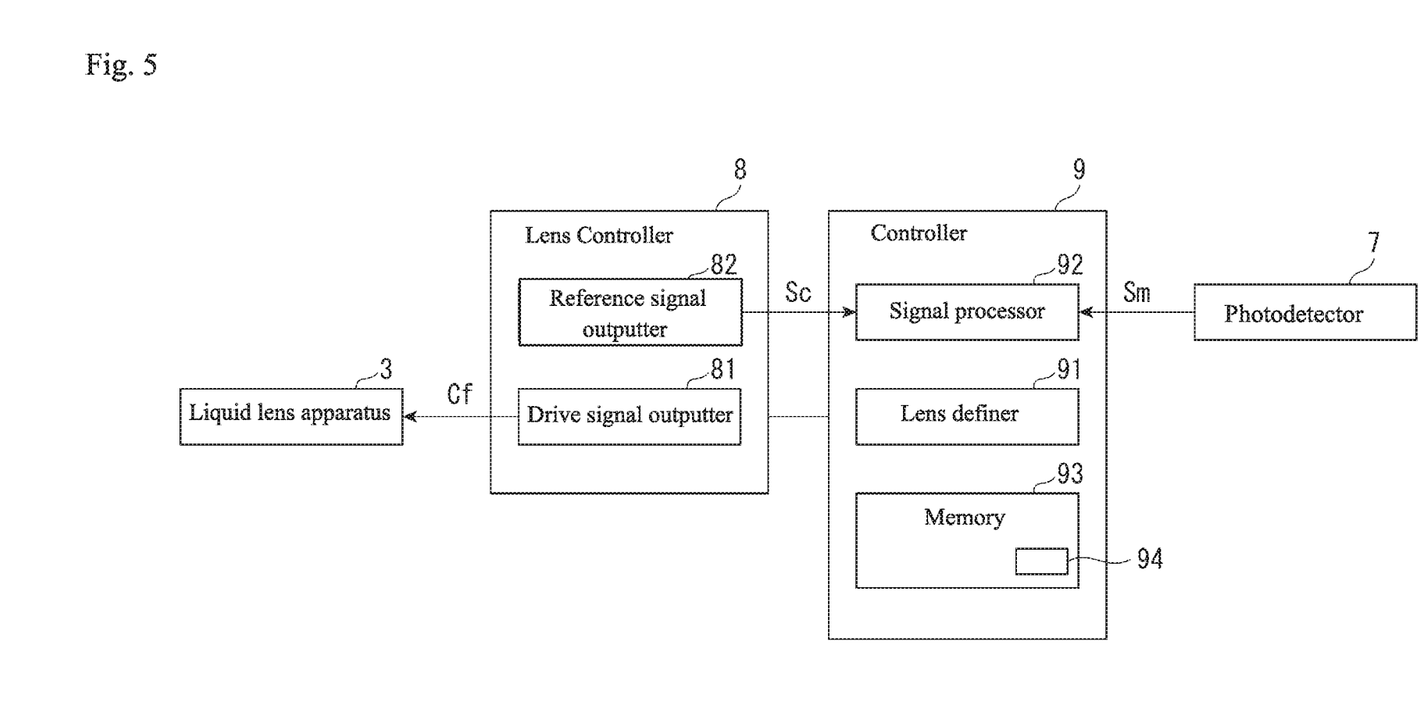
FIG. 5 is a block diagram schematically illustrating a controller according to the first embodiment.

As shown in FIG. 5, the lens controller 8 is configured as a control device that controls the operation of the liquid lens apparatus 3 and includes a drive signal outputter 81 outputting the drive signal Cf to the liquid lens apparatus 3. In addition, the lens controller 8 includes a reference signal outputter 82 outputting a reference signal Sc, in pulse, synchronized with the cycle of the drive signal Cf to the signal processor 92. Output timing of the reference signal Sc with respect to the cycle of the drive signal Cf can be arbitrarily set. In the present embodiment, the reference signal Sc rises once every two times when the drive signal Cf intersects level 0 (in FIG. 6, for example, timing when the fluctuate waveform Mf of the focus position Pf reaches a positive peak).

Controller

The controller 9 is configured by a personal computer and the like, and includes, for example, a CPU (Central Processing Unit) and memory. The controller 9 performs expected functionality by running predetermined software and includes a lens definer 91 that defines the lens controller 8 and the signal processor 92 that processes various input signals. Also, the controller 9 includes memory 93 configured by memory and the like.

The lens definer 91 performs settings such as frequency of the drive signal Cf that is output by the lens controller 8, amplitude, and maximum drive voltage. In the liquid lens apparatus 3, resonance variation number varies due to a change in atmospheric temperature or the like. Therefore, the lens definer 91 changes in real time the frequency of the drive signal Cf by a feedback control and achieves a stable operation of the liquid lens apparatus 3.

In the signal processor 92, the photodetection signal Sm is entered from the photodetector 7 and the reference signal Sc is entered from the lens controller 8. The signal processor 92 calculates a position on the optical axis A of the surface of the measured object W (measured object position Pw) by performing the process based on the photodetection signal Sm and the reference signal Sc. A method of the signal processing by the signal processor 92 is described later. In the memory 93, a table 94 that is prepared in advance by using a calibration work piece and the like is stored. In the table 94, the measured object position Pw and a phase φ of focus timing T with respect to the cycle of the drive signal Cf that is described hereafter are associated with each other.

Signal Processor

Figure 6:
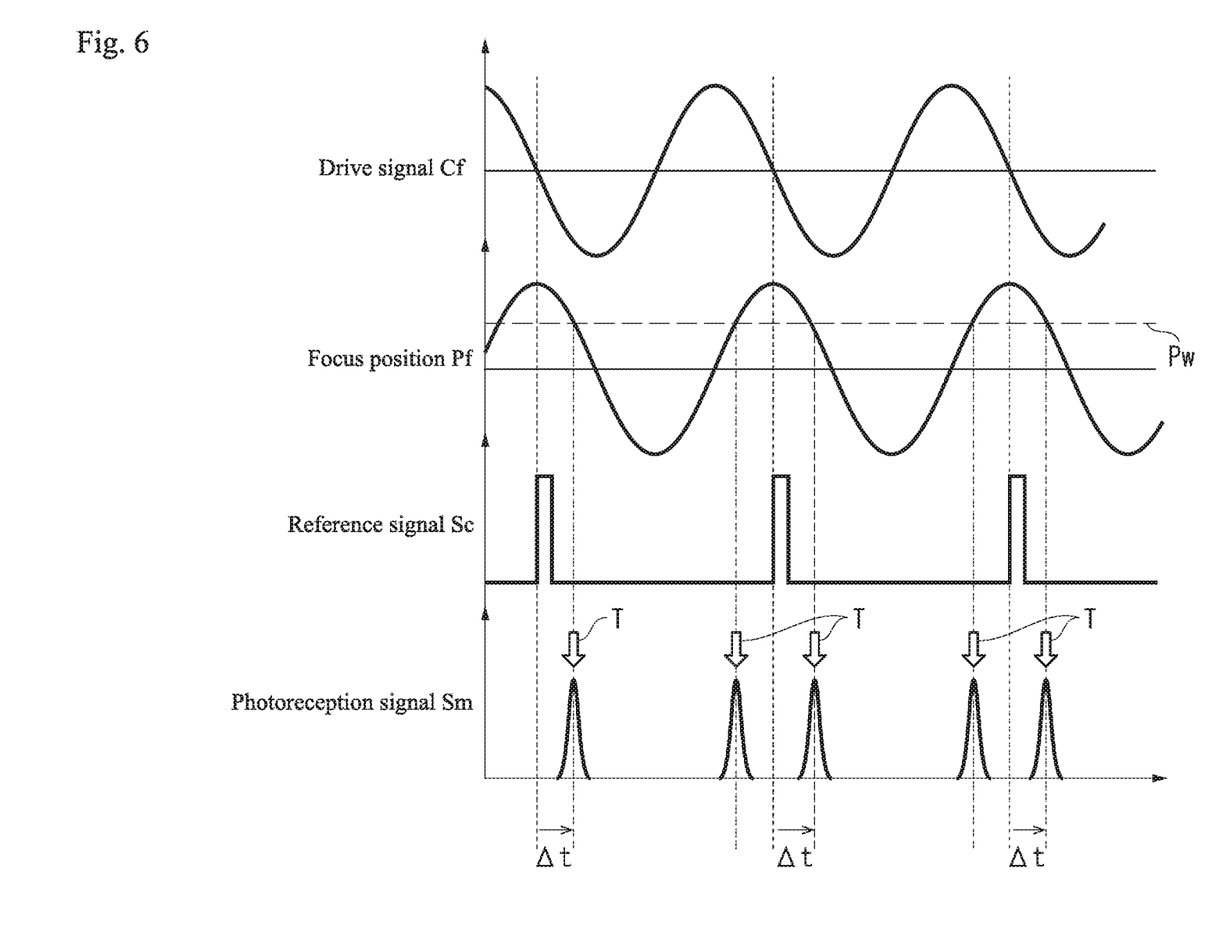
FIG. 6 is a graph illustrating a drive signal, a focus position, a reference signal, and a photodetection signal according to the first embodiment.

Next, a process of the signal processor 92 according to the present embodiment is described. The signal processor 92 obtains, after starting the measurement operation of the non-contact type displacement sensor 1, the reference signal Sc and the photodetection signal Sm as shown in FIG. 6. In FIG. 6, the focus position Pf by the variable focal length lens 10 changes periodically in the same cycle as the drive signal Cf and the reference signal Sc is output in pulse, synchronized with the cycle of the drive signal Cf (cycle of the fluctuation waveform Mf of the focus position Pf). Also, in FIG. 6, an example of the measured object position Pw located within a variable range of the focus position. Pf is shown. The photodetection signal Sm shows peak when the focus position Pf aligns with the measured object position Pw (focus timing T) and shows two peaks per cycle of the drive signal Cf.

First, the signal processor 92 calculates, after calculating the peak time of the photodetection signal Sm as the focus timing T, a delay time Δt of the focus timing T with respect to the reference signal Sc. In the present embodiment, as the delay time Δt of the focus timing T with respect to the reference signal Sc, time from the reference signal Sc rising to the focus timing T immediately after the reference signal Sc is calculated.

Then, the signal processor 92 calculates the phase φ of the focus timing T with respect to the cycle of the drive signal Cf based on the delay time Δt. Specifically, by using frequency f of the drive signal Cf and the delay time Δt, the phase φ of the focus timing T is calculated based on Formula (1) below.

$$\varphi = 2\pi f \Delta t \quad \text{Formula (1)}$$

The phase φ of the focus timing T found in this way has a correspondence relationship with the measured object position Pw in the variable range of the focus position Pf.

Then, the signal processor 92 obtains the measured object position Pw, based on the phase φ of the calculated focus timing T, by referencing to the table 94. In the table 94, the measured object position Pw and the phase φ of the focus timing T are associated with each other by an experiment and the like performed in advance. With the signal processing of the signal processor 92 noted above, the non-contact typo displacement sensor 1 can measure the measured object position Pw. The signal processor 92 may perform the above-noted processes every predetermined amount of time, and the obtained measured object position Pw may be successively stored in the memory 93.

Effect of First Embodiment

The non-contact typo displacement sensor 1 according to the present embodiment does not require a lens drive mechanism and a scale that are conventionally required in the configuration of a laser displacement sensor, by using the variable focal length lens 10. In addition, the measured object position Pw is obtained by using the drive signal Cf and the photodetection signal Sm, and therefore, processing a large amount of data is not necessary which is performed in the conventional chromatic point sensor. Accordingly, the present embodiment provides the non-contact type displacement sensor 1 that can simplify the configuration and process. Also, in the present embodiment, the measured object position Pw can be simply found by calculating the phase $\varphi$ of the focus timing T with respect to the cycle of the drive signal Cf based on the delay time $\Delta t$ of the focus timing T with respect to the reference signal Sc.

In addition, the non-contact typo displacement sensor 1 according to the present embodiment facilitates switching a magnification of the objective lens 2 which was difficult in the conventional technology. Specifically, in the conventional technology, the laser displacement sensor has the objective lens incorporated into the lens drive mechanism, and the chromatic point sensor has the objective lens modularized with a special lens group that disperses white light by an axial chromatic aberration. Therefore, in the laser displacement sensor and the chromatic point sensor, it was difficult to replace only the objective lens with a different type having a different magnification and a separate device was necessary to measure in a different measurement range and resolution. However, in the non-contact type displacement sensor 1 according to the present embodiment, there is no need to integrate the objective lens with other configuration as in the prior art. Accordingly, it is easy to configure the objective lens 2 to be capable of switching with a different objective lens 2 having a different magnification.

In the present embodiment, a confocal point optical system is configured for the focus position Pf to detect the focus timing T that is aligned with the surface of the measured object W. Therefore, compared to a case when other focal point detection method is used, the measurement accuracy can be improved since measurement accuracy due to surface characteristics such as inclination and asperity of the surface of the measured object W is hardly influenced. Also, by using the optical fiber 52, the light source 6 and the photodetector 7 as a heat source can be placed away from a portion that is a measurement head, and thermal effect on the measurement can be reduced. Further, the end surface 520 of the optical fiber 52 plays both roles as a point light source and a pinhole for detection of the confocal point optical system, and therefore, the number of adjustment steps for manufacturing can be significantly reduced.

Second Embodiment

Figure 7:
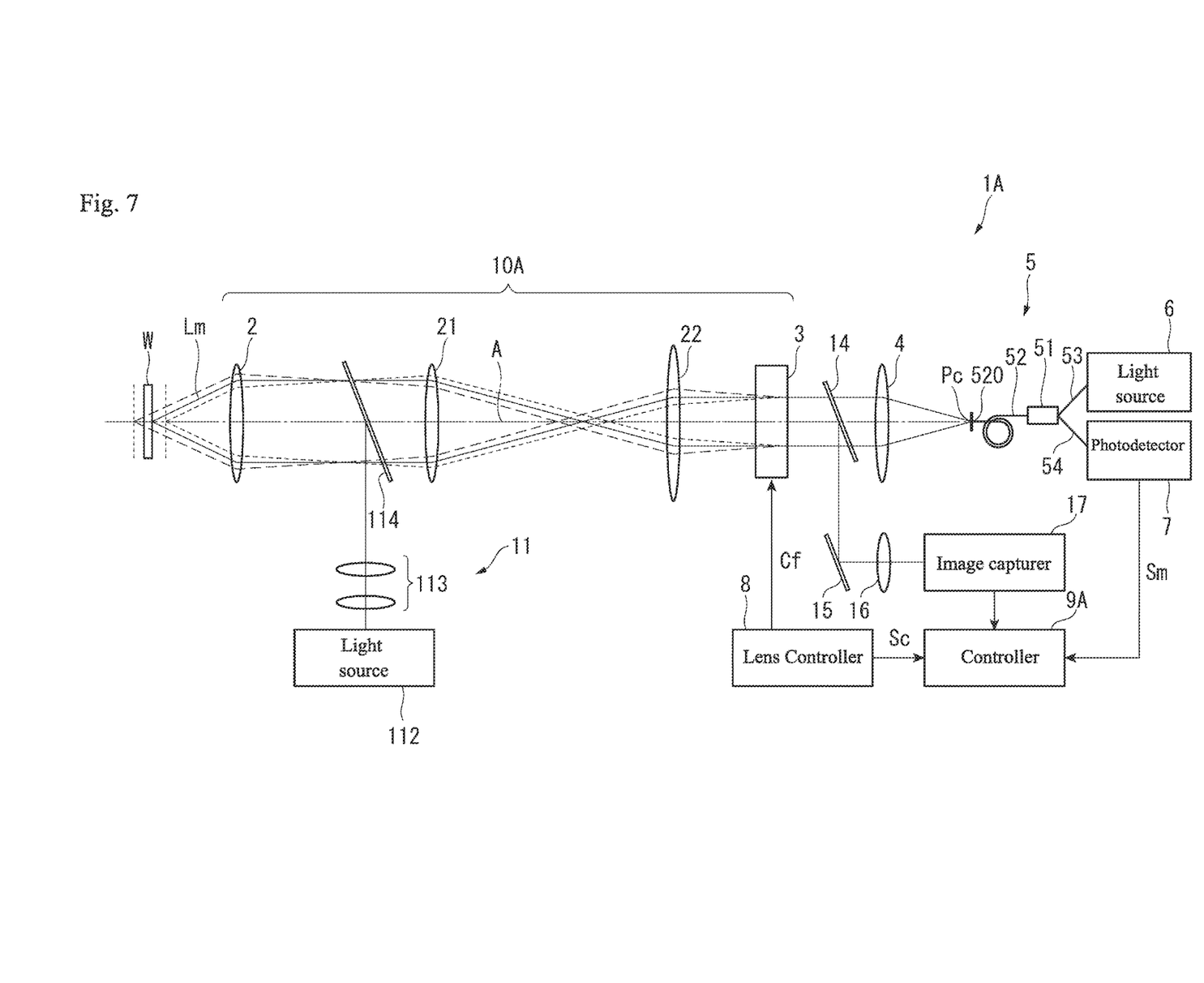
FIG. 7 is a schematic view illustrating a non-contact type displacement sensor according to a second embodiment of the present invention.

A non-contact type displacement sensor 1A according to a second embodiment is described with reference to FIGS. 7 and 8. Moreover, in the second embodiment, configurations similar to those of the first embodiment are given the same reference numerals and a detailed description thereof is omitted.

The non-contact type displacement sensor 1A of the second embodiment has an additional configuration for observing the measured object W with respect to the non-contact type displacement sensor 1 of the first embodiment. As shown in FIG. 7, the non-contact type displacement sensor 1A includes, in addition to the configuration described in the first embodiment, an illuminator 11, a light separation portion 14, a reflecting plate 15, an imaging lens 16, and an image capturer (image sensor, imaging element) 17.

The illuminator 11 includes a light source 112, an illumination optical system 113, and a beam splitter 114. The light source 112 is a light emitting diode (LED) for example and emits observation light having different wavelength to the light source 6. The illumination optical system 113 defuses the observation light emitted from the light source 112. The beam splitter 114 is arranged between the objective lens 2 and the liquid lens apparatus 3 and reflects the observation light incident from the illumination optical system 113 on the measured object W side. In addition, the beam splitter 114 allows the measurement light Lm that advances along the optical axis A and the observation light reflected by the measured object W to transit. The observation light emitted from the illuminator 11 in this way is emitted at the measured object W via the objective lens 2.

The light separation portion 14 is a beam splitter or a dichroic mirror, for example, and is arranged between the liquid lens apparatus 3 and the collimating lens 4. The light separation portion 14 separates light transiting again the variable focal length lens 10 that is reflected by the measured object W (measurement light Lm and observation light) into light advancing toward the collimating lens 4 and light advancing toward the image capturer 17. For example, the light separation portion 14 may separate light transiting again a variable focal length lens 10A that is reflected by the measured object W based on wavelength. Then, the measurement light Lm may advance toward the collimating lens 4 and the observation light may advance toward the image capturer 17. Alternatively, the light separation portion 14 may simply separate light transiting again the variable focal length lens 10A reflected by the measured object W at an arbitrary ratio without distinction of the measurement light Lm and the observation light.

In such a configuration, the measurement light transiting the light separation portion 14 reflected by the measured object W after transiting the variable focal length lens 10A again is collected after entering to the collimating lens 4. On the other hand, the observation light reflected by the light separation portion 14 reflected by the measured object W and after transiting again the variable focal length lens 10A is formed an image by the imaging lens 16 via the reflecting plate 15 and the like. The image capturer 17 captures an image formed by the imaging lens 16.

The variable focal length lens 10A includes a plurality of relay lenses 21 and 22 between the objective lens 2 and the liquid lens apparatus 3. The relay lenses 21 and 22 are arranged so as to conjugate an exit pupil of the objective lens 2 and a position of a principal point of the liquid lens apparatus 3, and perform a relay of the exit pupil of the objective lens 2 while keeping a telecentric optical system. Accordingly, even when the focus position Pf is fluctuated, a magnification power of the image incident on the image capturer 17 stays constant.

Figure 8:
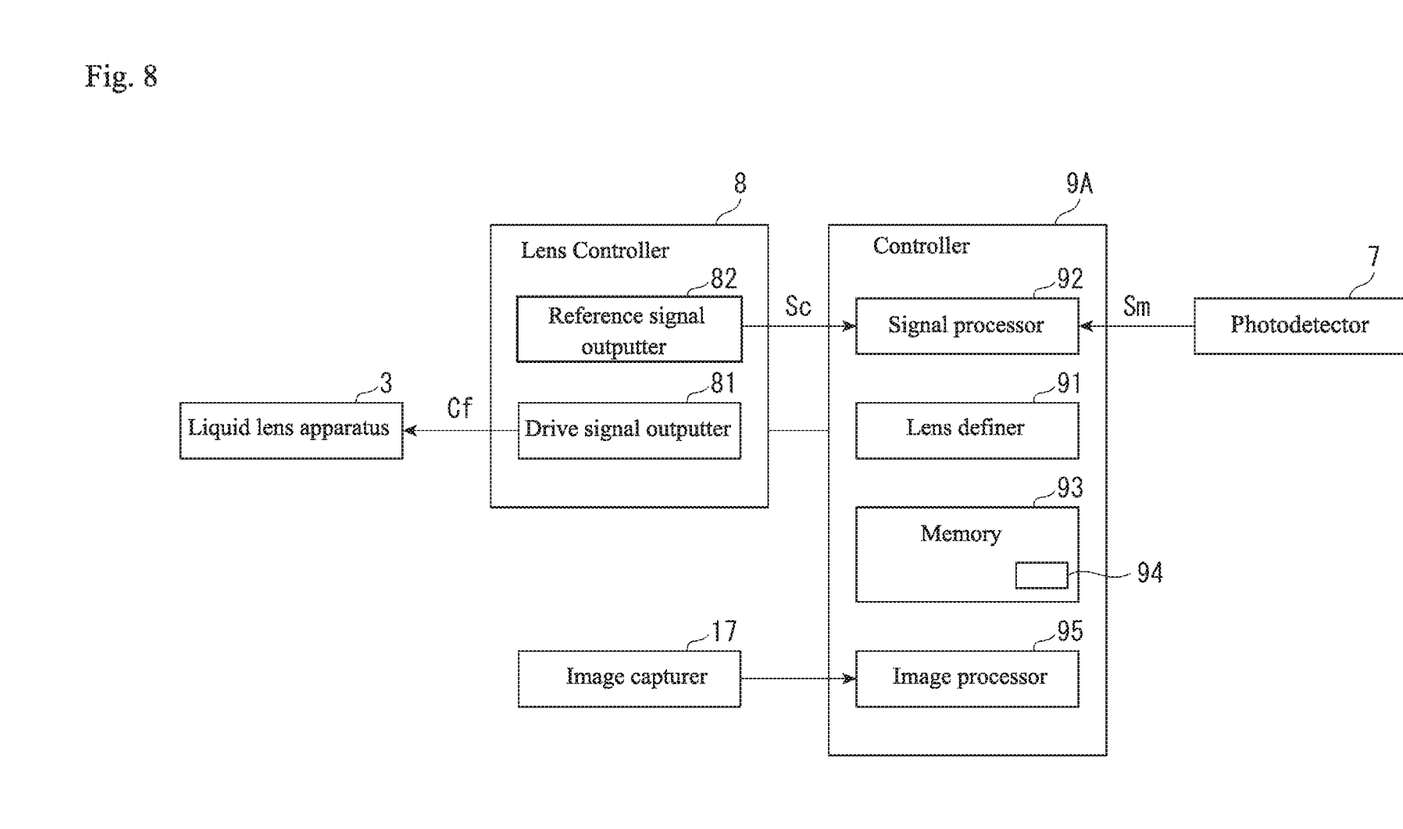
FIG. 8 is a block diagram schematically illustrating a controller according to the second embodiment.

As shown in FIG. 8, a controller 9A includes an image processor 95. The image processor 95 imports and processes the image from the image capturer 17. In this example, while the observation light emitted at the measured object W is constantly illuminated, the focus position Pf periodically changes. Therefore, the image captured by the image capturer 17 is a mix between an image focused on the surface of the measured object W and an image not focused on the surface. As a result, the image is blurry.

The image processor 95 generates an extended focal depth image by performing a deconvolution processing to the image imported from the image capturer 17. As for a specific method of the deconvolution processing, Japanese Patent Laid-open Publication No. 2015-104136 can be referred to, for example.

In such a non-contact typo displacement sensor 1A, the position on the optical axis A of the surface of the measured object W is measured and the surface of the measured object W can also be captured. Accordingly, a state of the measured object W can be checked by the image while performing the measurement. In particular, when the measurement light enters the image capturer 17, a position of the measuring portion in the measured object W can be confirmed by the image. In addition, the extended focal depth image is an image that the blur is removed from the captured image, and therefore, an observation can be performed with a high degree of accuracy over the entire variable range of the focus position Pf in the variable focal length lens 10A. In addition, even when the focus position Pf is fluctuated, a magnification power of the image incident on the image capturer 17 stays constant, and therefore, it is possible to have an excellent observation without fluctuations in a field of view.

Modification

The present invention is not limited to the above-described embodiments, and includes modifications and improvements within a scope capable of achieving the advantages of the present invention.

In the various embodiments described above, the drive signal Cf and the fluctuation waveform Mf of the focus position Pf are sine waves, but they may instead be triangular waves, saw-tooth waves, rectangular waves, or some other waveforms. The specific configuration of the liquid lens apparatus 3 may be modified as needed and a case 31 and a vibrating member 32 may be a hexagonal cylindrical shape or the like other than a cylindrical shape and these dimensions and attributes of liquid 35 can also be selected as appropriate.

Figure 9:
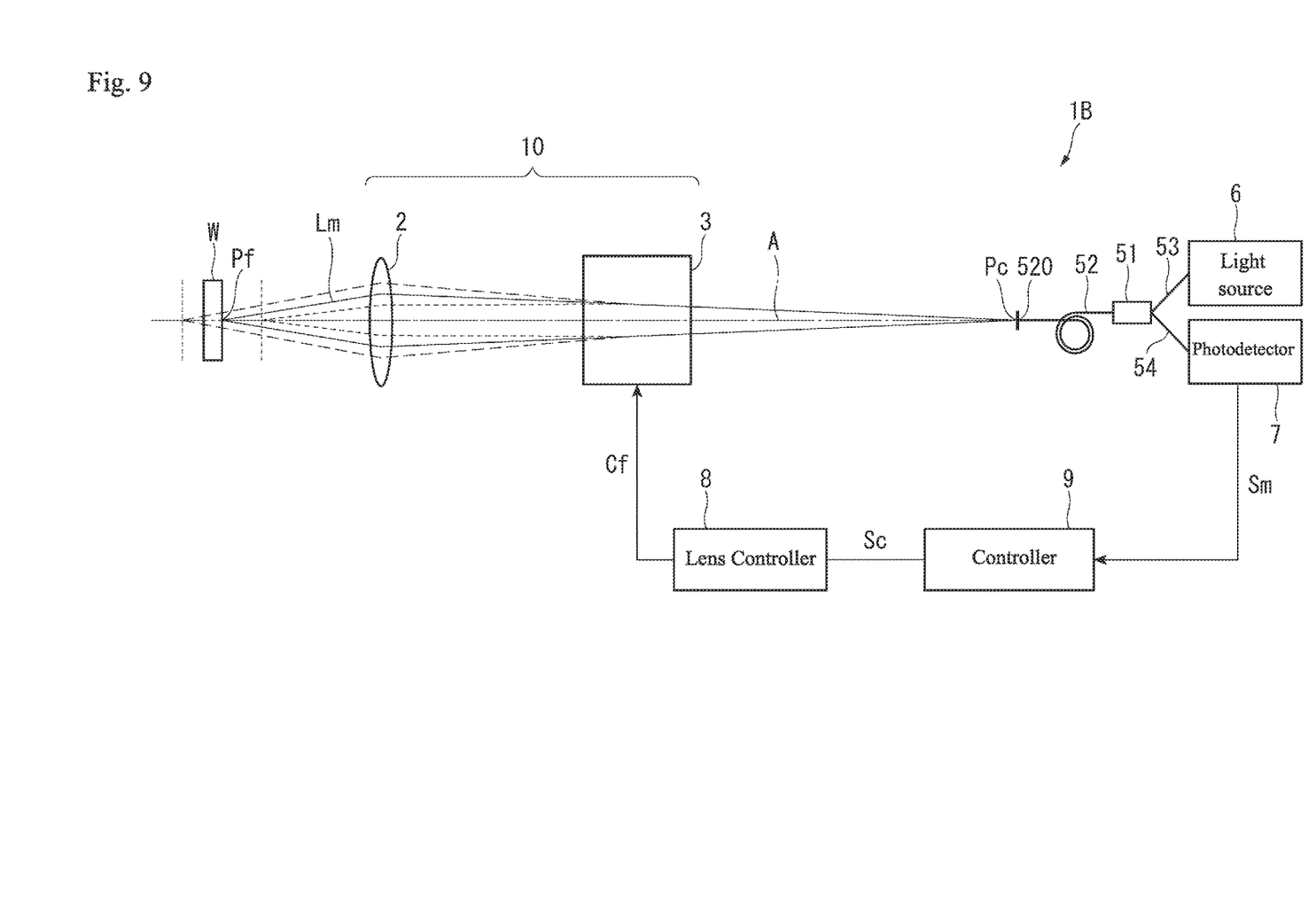
FIG. 9 is a schematic view illustrating a non-contact type displacement sensor according to a modification of the first embodiment.

In the various embodiments, an infinite distance correction optical system (an optical system where the parallel light by the collimating lens 4 enters the variable focal length lens 10 and 10A) is configured by the variable focal length lens 10 (10A) together with the collimating lens 4. For example, as shown in FIG. 9, in a non-contact type displacement sensor 1B which is a modification of the first embodiment, a finite distance correction optical system may be configured by the variable focal length lens 10 without the collimating lens 4. With the configuration described above, a similar effect to that of the first embodiment can be achieved.

Figure 10:
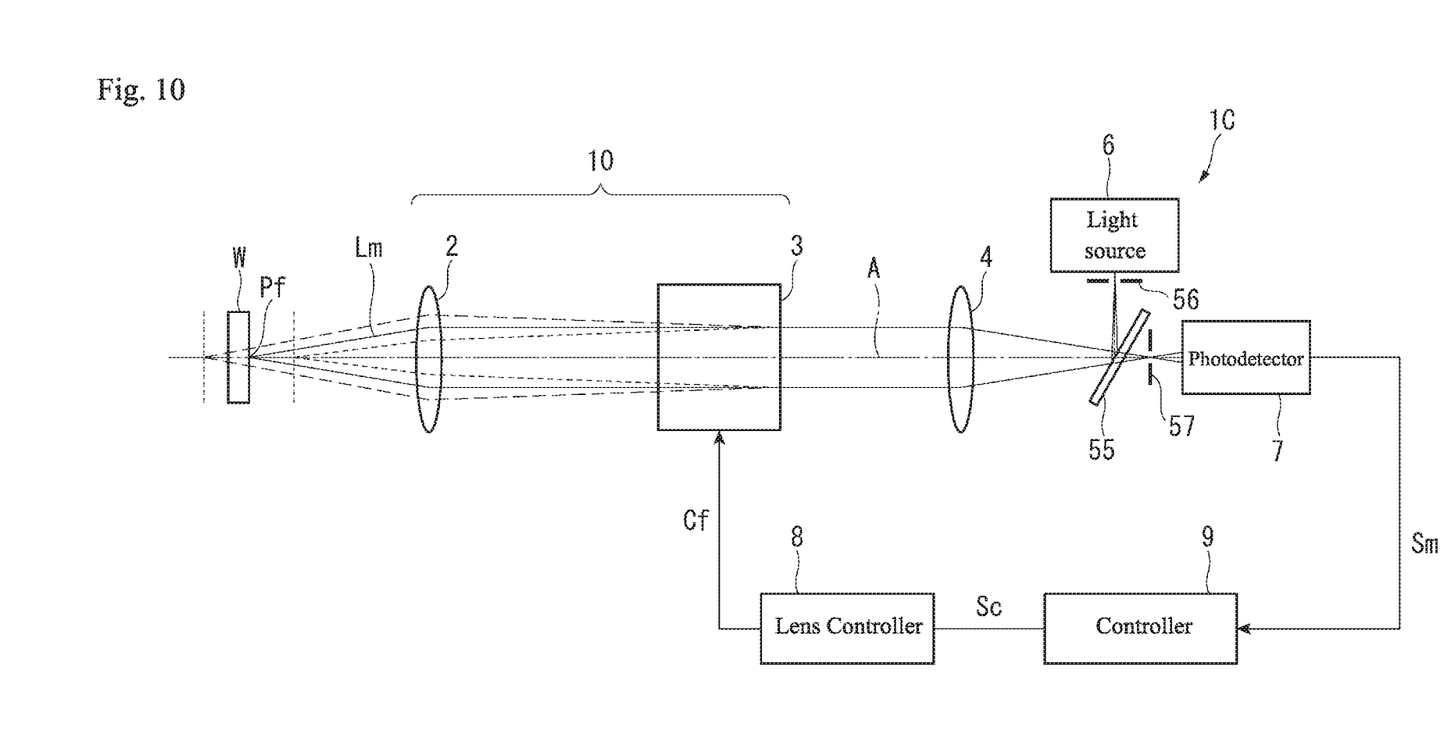
FIG. 10 is a schematic view illustrating a non-contact type displacement sensor according to another modification of the first embodiment.

In the various embodiments, a pinhole may be used without the light guiding portion 5. For example, as shown in FIG. 10, a non-contact type displacement sensor 1C which is a modification of the first embodiment may be provided with a beam splitter 55 and pinhole members 56 and 57 instead of the light guiding portion 5. Specifically, the beam splitter 55 is configured such that the measurement light Lm emitted from the light source 6 is bent toward the collimating lens 4 and light entered from the collimating lens 4 side transits to the pinhole member 57 side. The pinhole member 56 is arranged between the beam splitter 55 and the light source 6. The pinhole becomes a point light source by having the light source 6 emit the measurement light Lm via the pinhole of the pinhole member 56. The pinhole member 57 is arranged between the beam splitter 55 and the photodetector 7 and has a pinhole that is arranged at the focal point on the rear side of the collimating lens 4. The measurement light Lm in focus with and reflected by the measured object W enters the photodetector 7 after transiting the pinhole of the pinhole member 57. With the configuration described above, a similar effect to that of the first embodiment can be achieved.

In the various embodiments, the non-contact typo displacement sensors 1 and 1A obtain the focus timing T using a confocal point method, but the present invention is not limited to this. Specifically, the non-contact type displacement sensors 1 and 1A may obtain the focus timing using other various focus detection methods such as a double pinhole method, an astigmatic method, a knife edge method, and the like. For example, when the non-contact type displacement sensors 1 and 1A configure an optical system of a double pinhole type, the focus timing T can be obtained by providing a photodetector before and after the focus position respectively that forms a conjugate relation to the focus position Pf and calculation is performed based on the photodetection signal output from the respective photodetector. In the confocal point method, a peak position of the photodetection signal Sm must be detected in order to obtain the focus timing T. Although the calculation of the detection is complicated, but compared to the confocal point method, the double pinhole method, astigmatic method, and knife edge method use a simpler calculation that is required to obtain the focus timing T. Therefore, by adopting these methods, the operation time may be decreased to perform a high-speed measurement.

In the various embodiments, as the delay time $\Delta t$ of the focus timing T with respect to the reference signal Sc, time from rising time of the reference signal Sc up to the focus timing T immediately after the reference signal Sc is measured. However, the present invention is not limited to this. For example, the measurement may be started from the rising time of the reference signal Sc. In addition, instead of the time from the reference signal Sc to the first focus timing T, time from the reference signal Sc to the second focus timing T may be measured.

In the various embodiments, the non-contact type displacement sensors 1 and 1A are provided with the reference signal outputter 82, and the signal processor 92 calculates the phase $\varphi$ of the focus timing T based on the delay time $\Delta t$ of the focus timing T with respect to the reference signal Sc. However, the present invention is not limited to this. For example, the non-contact type displacement sensors 1 and 1A may not include the reference signal outputter 82. In this case, the signal processor 92 may calculate the phase $\varphi$ of the focus timing T based on the time difference between two of the focus timing T that appear in one cycle of the drive signal Cf. Specifically, the signal processor 92 can calculate the phase $\varphi$ of the focus timing T based on Formula (2) using a frequency f of the drive signal Cf and a delay time $\Delta ta$ of the two focus timing T.

$$\varphi = \pi[1 - f(\Delta ta)] \qquad \text{Formula (2)}$$

According to this method, the phase $\varphi$ of the focus timing T can be calculated by a simpler calculation. Alternatively, the non-contact type displacement sensors 1 and 1A may obtain the phase $\varphi$ of the focus timing T using a calculation or the like based on the sine waves shown by the drive signal Cf.

In the various embodiments, the signal processor 92 obtains the measured object position Pw by referencing the table 94 where the delay time Δt and the measured object position Pw are associated with each other. However, the present invention is not limited to this. For example, the signal processor 92 may calculate the measured object position Pw by using a calculation expression that expresses a relationship between the delay time Δt and the measured object position Pw.

In the various embodiments, instead of the lens controller 8 including the reference signal outputter 82, the controller 9 may include the reference signal outputter. Alternatively, the reference signal outputter may be configured separately from the lens controller 8 and the controller 9. In addition, the lens controller 8 and the controller 9 may be configured as an integrated control device.

In the second embodiment, the extended focal depth image is generated by performing the deconvolution processing to the image which is out of focus. However, the present invention is not limited to this. For example, in the second embodiment, the light source 112 of the illuminator 11 may be a type that performs pulse emission. In this case, the light source 112 is controlled by a controller 9A, for example. The light source 112 preferably emits light by the phase with respect to the drive signal Cf and a light emission signal that is set based on the amplitude. Accordingly, a desired image can be obtained at the desired focus position Pf.

The present invention can be used as a non-contact type displacement sensor that can simplify a configuration and process.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A non-contact type displacement sensor comprising:
a light source which emits measurement light;
a liquid lens in which a refractive index periodically changes in response to an input drive signal;
an objective lens which emits, at a measurable object, the measurement light which is emitted from the light source and which has passed through the liquid lens;
a photodetector which receives the measurement light reflected by the measurable object and that outputs a photodetection signal; and
a signal processor which:
calculates focus timings with which the measurement light is in focus on a surface of the measurable object based on the photodetection signal output from the photodetector,
calculates a phase of a focus timing with respect to a cycle of the drive signal, and
obtains a position of the measurable object based on the phase.

2. The non-contact type displacement sensor according to claim 1, further comprising:
a lens controller which operates as reference signal outputter that outputs a reference signal synchronized with the drive signal, wherein the signal processor calculates the phase based on a delay time of the said focus timing with respect to the reference signal.

3. The non-contact type displacement sensor according to claim 1, wherein
the signal processor calculates the phase based on a time difference between two said focus timings that appear in one cycle of the drive signal.

4. The non-contact type displacement sensor according to claim 1, further comprising:
an illuminator which emits observation light at the measurable object via the objective lens;
an imaging lens that forms the observation light which has passed through the objective lens and the liquid lens after being reflected by the measurable object; and
an image sensor that captures an image formed by the imaging lens.

5. The non-contact type displacement sensor according to claim 2, further comprising:
an illuminator which emits observation light at the measurable object via the objective lens;
an imaging lens that forms the observation light which has passed through the objective lens and the liquid lens after being reflected by the measurable object; and
an image sensor that captures an image formed by the imaging lens.

6. The non-contact type displacement sensor according to claim 3, further comprising:
an illuminator which emits observation light at the measurable object via the objective lens;
an imaging lens that forms the observation light which has passed through the objective lens and the liquid lens after being reflected by the measurable object; and
an image sensor that captures an image formed by the imaging lens.

7. The non-contact type displacement sensor according to claim 4, further comprising an image processor that performs a deconvolution processing on the image captured by the image sensor.

8. The non-contact type displacement sensor according to claim 5, further comprising an image processor that performs a deconvolution processing on the image captured by the image sensor.

9. The non-contact type displacement sensor according to claim 6, further comprising an image processor that performs a deconvolution processing on the image captured by the image sensor.

10. The non-contact type displacement sensor according to claim 4, further comprising a plurality of relay lenses that are arranged so as to conjugate an exit pupil of the objective lens and a position of a principal point of the liquid lens.

11. The non-contact type displacement sensor according to claim 5, further comprising a plurality of relay lenses that are arranged so as to conjugate an exit pupil of the objective lens and a position of a principal point of the liquid lens.

12. The non-contact type displacement sensor according to claim 6, further comprising a plurality of relay lenses that are arranged so as to conjugate an exit pupil of the objective lens and a position of a principal point of the liquid lens.

13. The non-contact type displacement sensor according to claim 7, further comprising a plurality of relay lenses that are arranged so as to conjugate an exit pupil of the objective lens and a position of a principal point of the liquid lens.

14. The non-contact type displacement sensor according to claim 8, further comprising a plurality of relay lenses that are arranged so as to conjugate an exit pupil of the objective lens and a position of a principal point of the liquid lens.

15. The non-contact type displacement sensor according to claim 9, further comprising a plurality of relay lenses that are arranged so as to conjugate an exit pupil of the objective lens and a position of a principal point of the liquid lens.

* * * * *